June 22, 1937.  R. W. ALLEN  2,084,547
APPARATUS FOR TESTING BRAKES
Filed Sept. 25, 1933  7 Sheets-Sheet 6
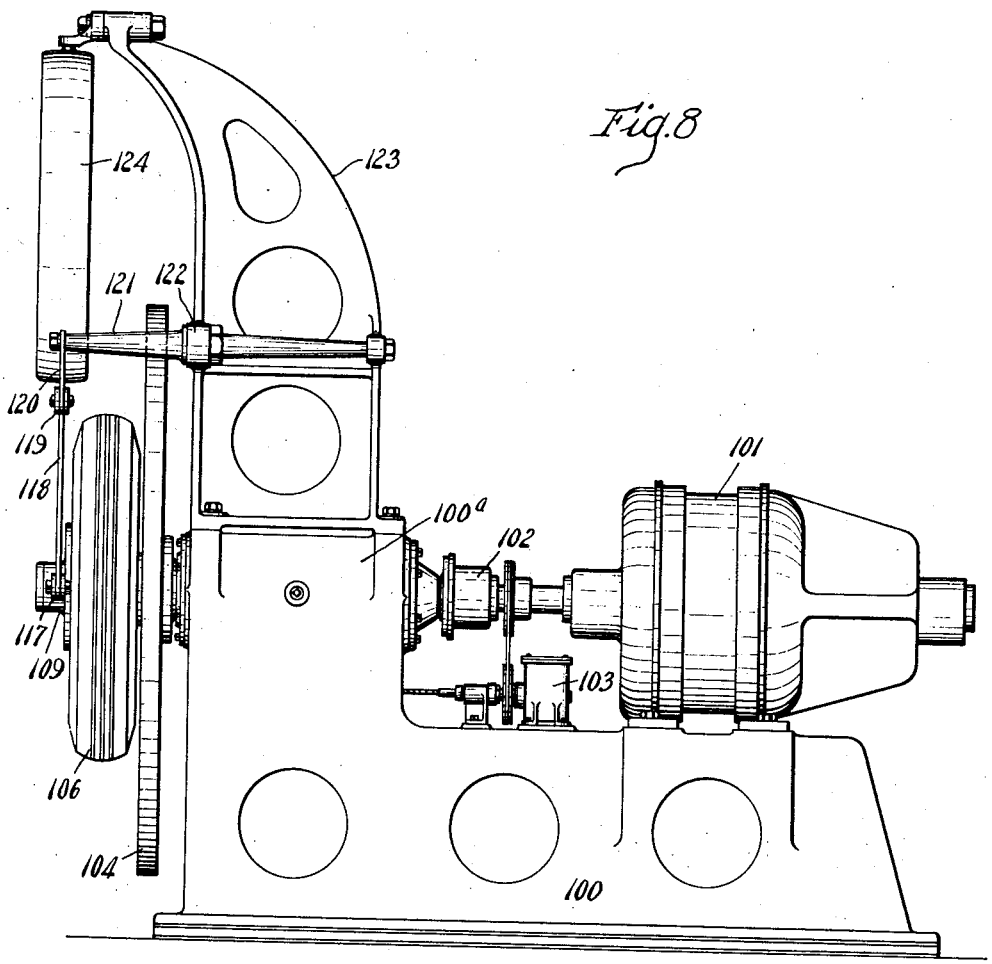
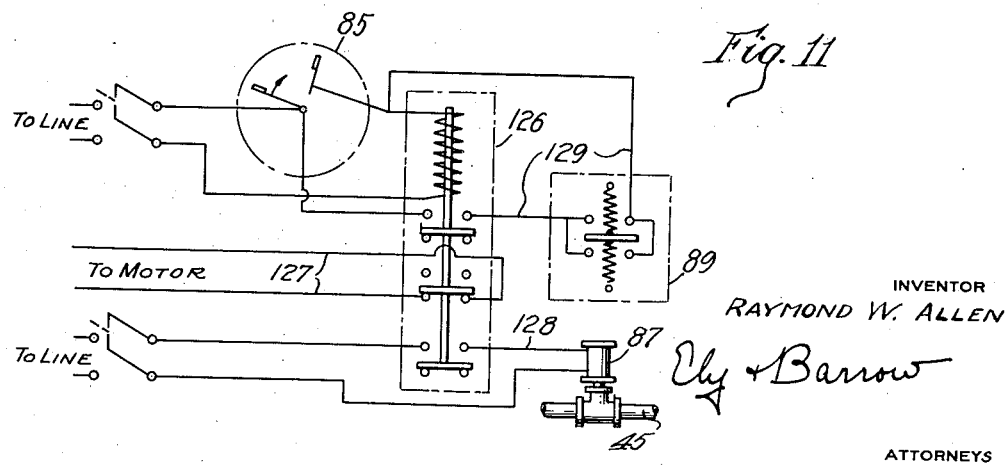
INVENTOR
RAYMOND W. ALLEN
ATTORNEYS

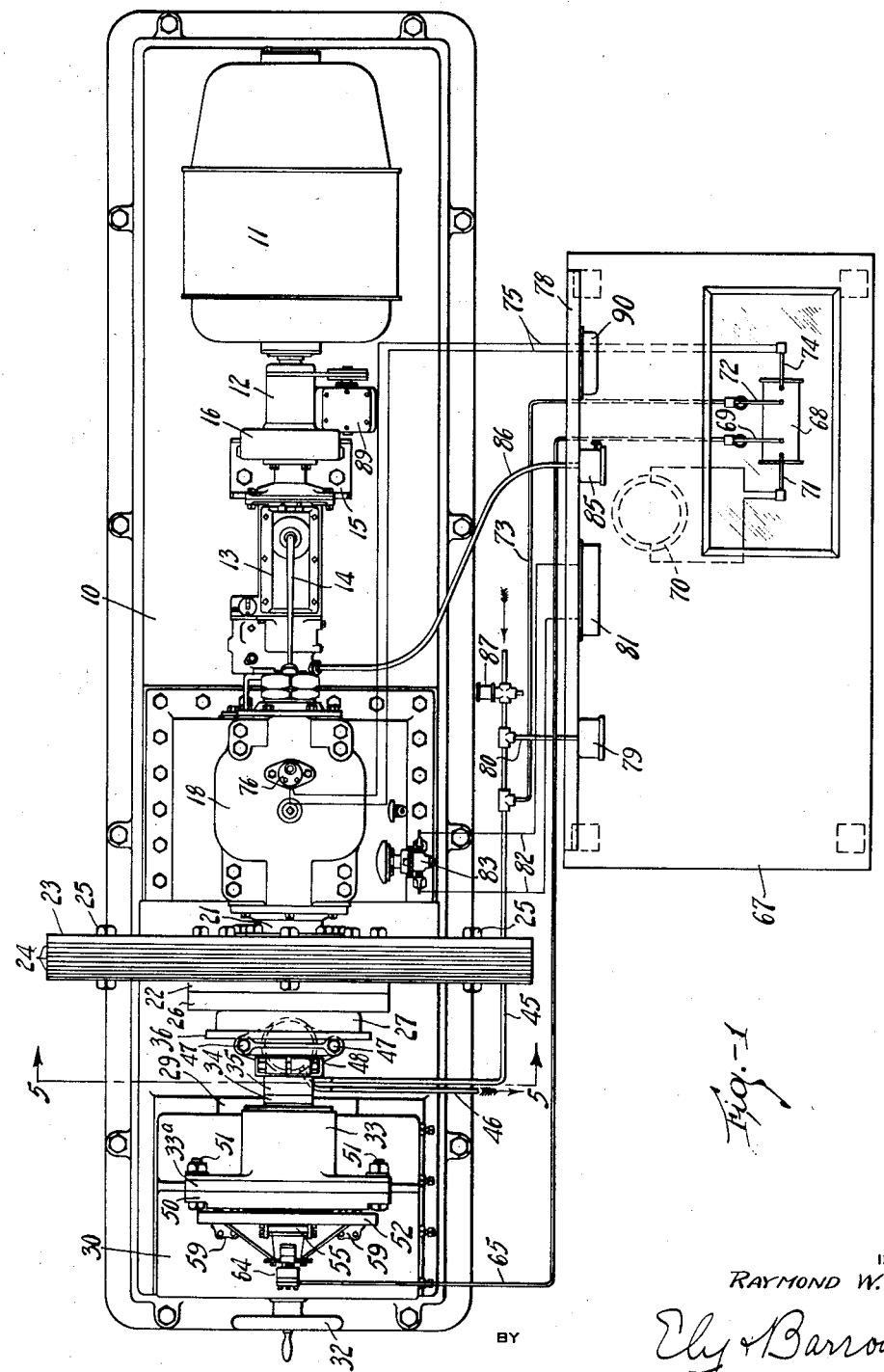

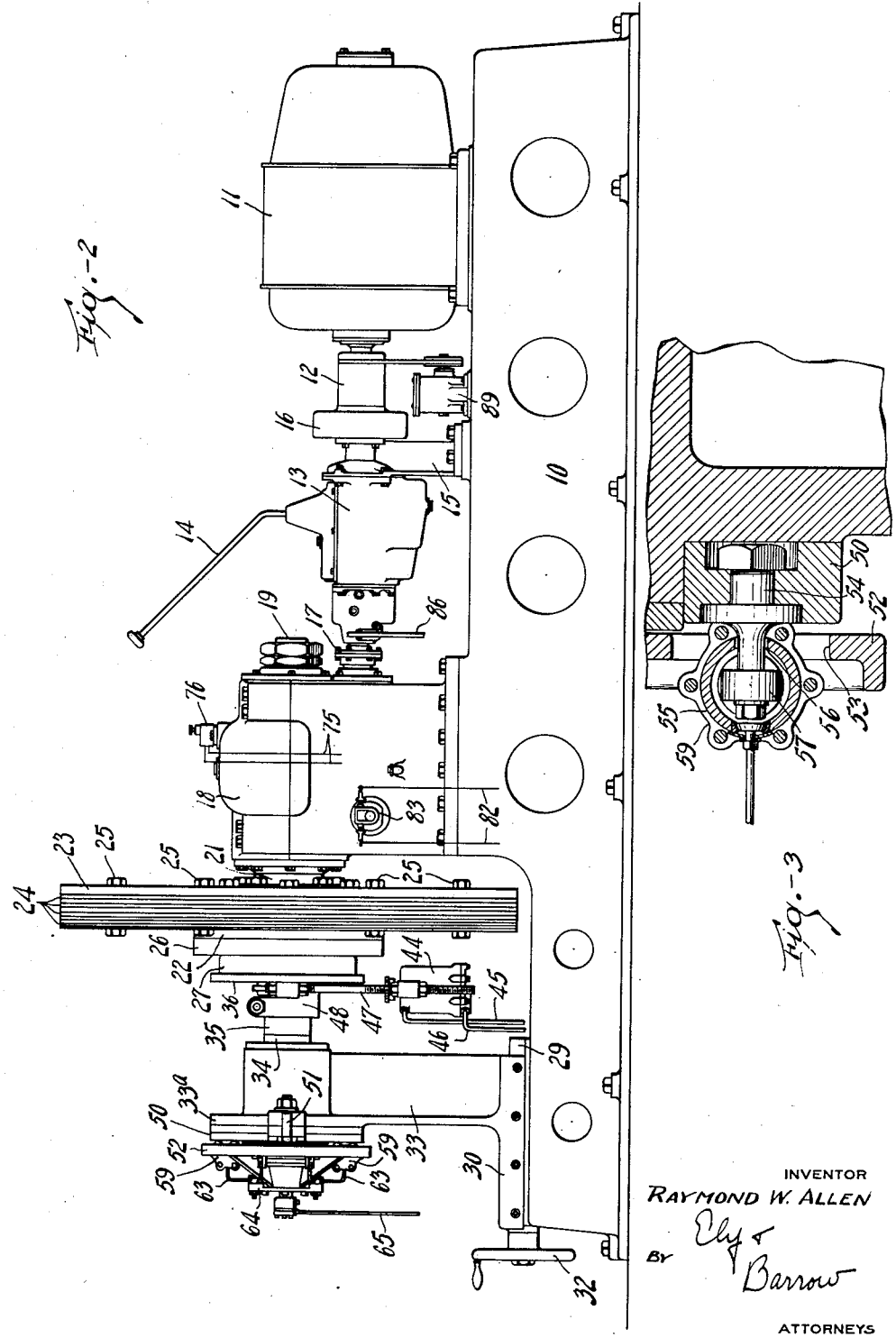

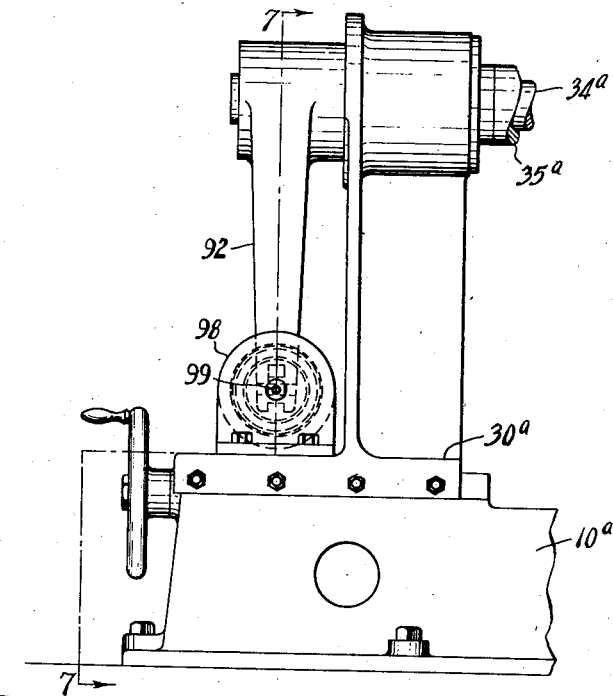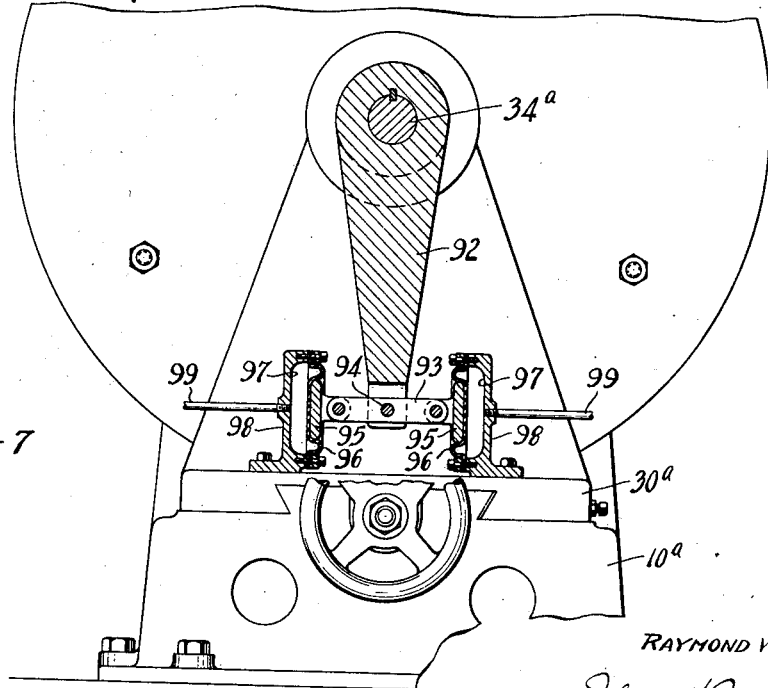

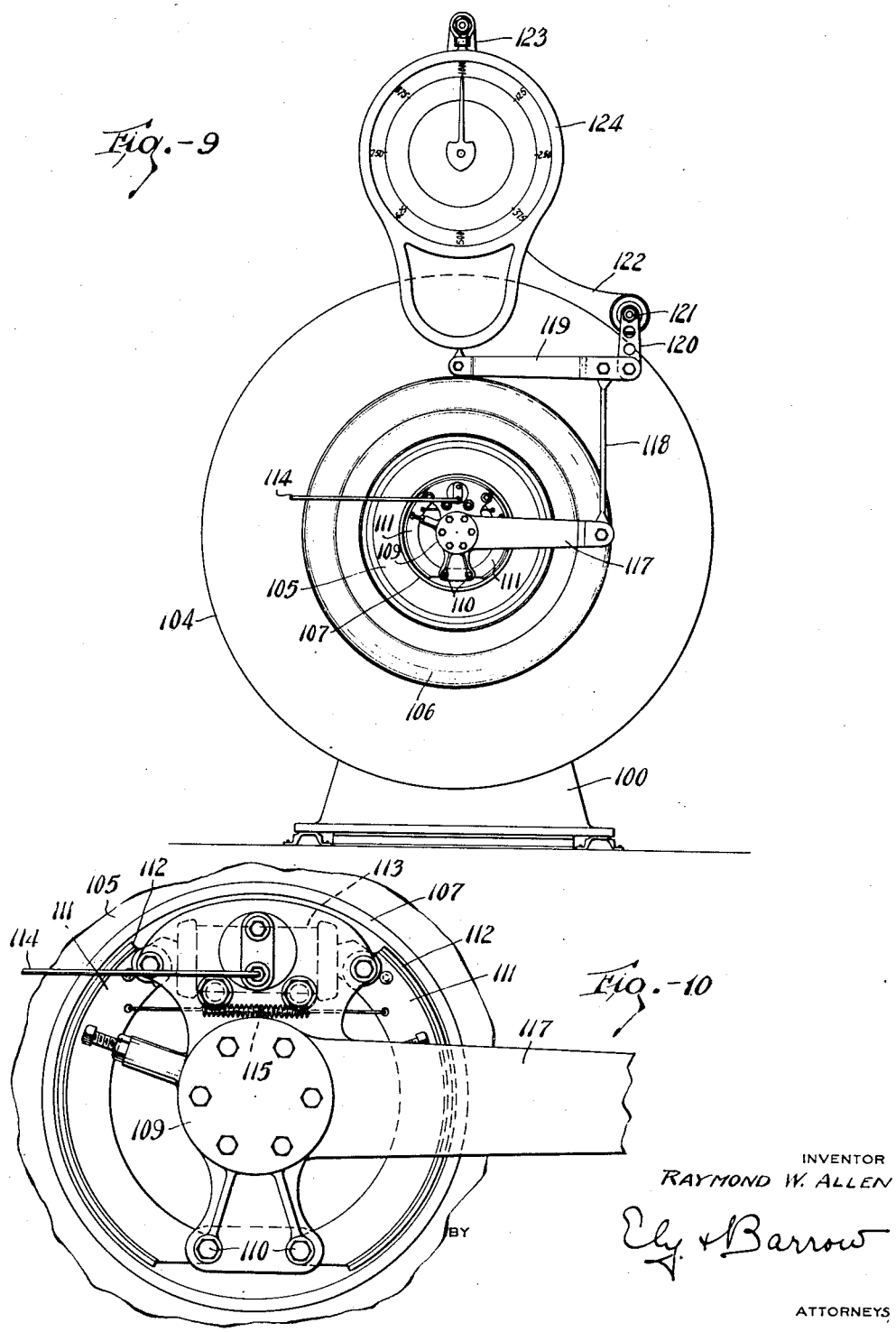

Patented June 22, 1937

2,084,547

UNITED STATES PATENT OFFICE 2,084,547

APPARATUS FOR TESTING BRAKES

Raymond W. Allen, Akron, Ohio, assignor to The Firestone Tire & Rubber Company, Akron, Ohio, a corporation of Ohio Application September 25, 1933, Serial No. 690,816

8 Claims. (Cl. 265—24)

This invention relates to apparatus for testing brakes, and more especially it relates to mechanism for testing brakes and brake linings in the shop under conditions similar to those that obtain when the brakes are in service on motor vehicles.

The chief objects of the invention are to provide accuracy of results in the testing of brakes; and to provide improved apparatus for testing brakes. More specifically, the invention aims to provide brake testing apparatus that is easily adjustable as to its application of torque to the brake being tested, whereby conditions in vehicles of different weights are simulated; and to provide automatic features in the apparatus whereby the brake is brought into action as soon as a determinate speed is obtained, and released as soon as one member is brought to rest to avoid back-lash of another member. Other objects will be manifest.

Of the accompanying drawings;

Figure 1 is a plan view of one embodiment of the improved brake testing apparatus;

Figure 2 is a side elevation thereof, a table having recording instruments thereon being omitted for clearness of illustration;

Figure 3 is a section on the line 3—3 of Figure 4;

Figure 6 is a detail side elevation of one end portion of another embodiment of the invention;

Figure 7 is a section on the line 7—7 of Figure 6;

Figure 8 is a side elevation of still another embodiment of the invention;

Figure 9 is an end elevation thereof;

Figure 10 is a fragmentary elevation, on a larger scale, of some of the mechanism shown in Figure 9; and Figure 11 is a wiring diagram of certain electrically operated elements of the apparatus.

Figure 4:
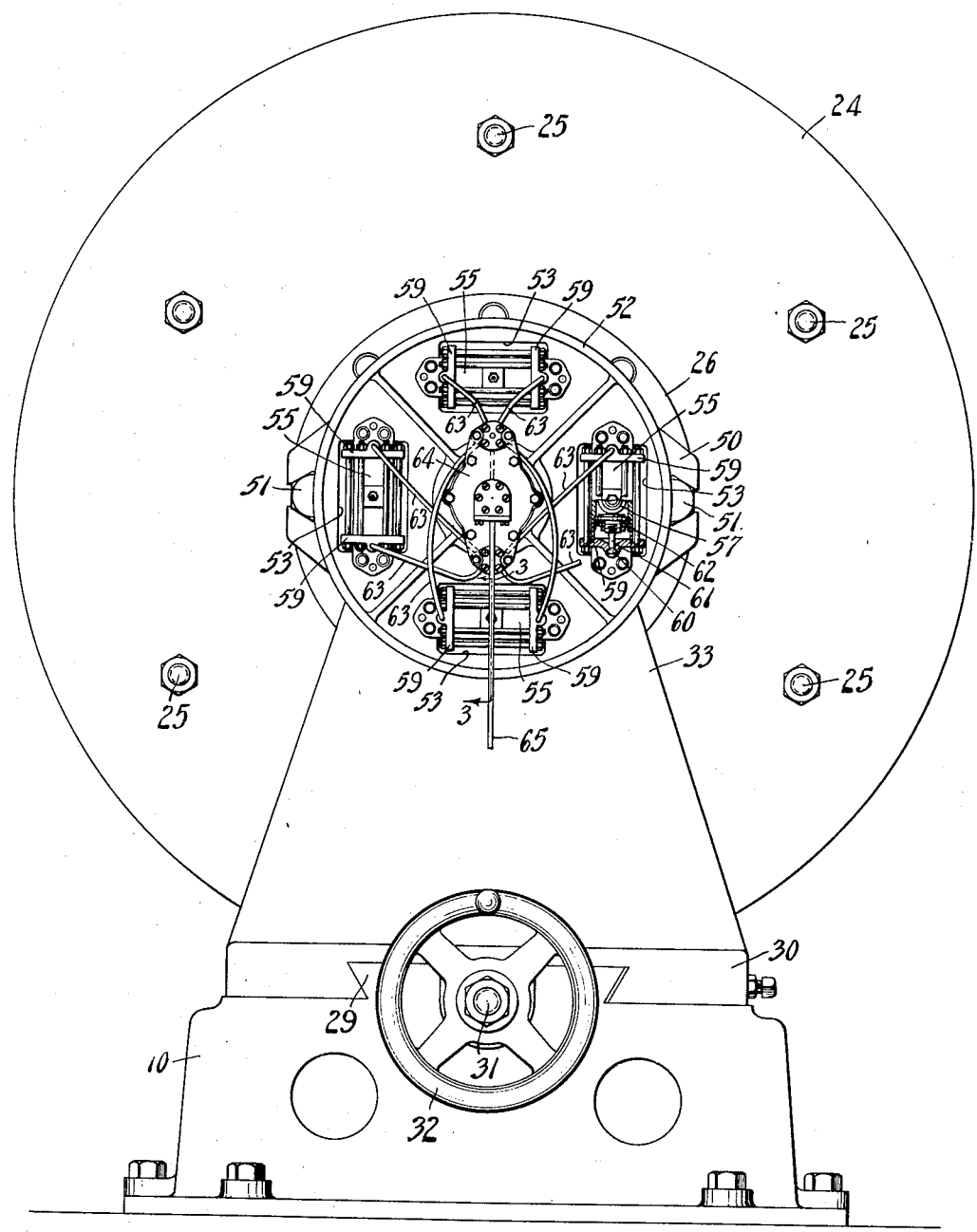
Figure 4 is an end elevation, on a larger scale, of the apparatus as viewed from the left of Figure 1.
Figure 5:
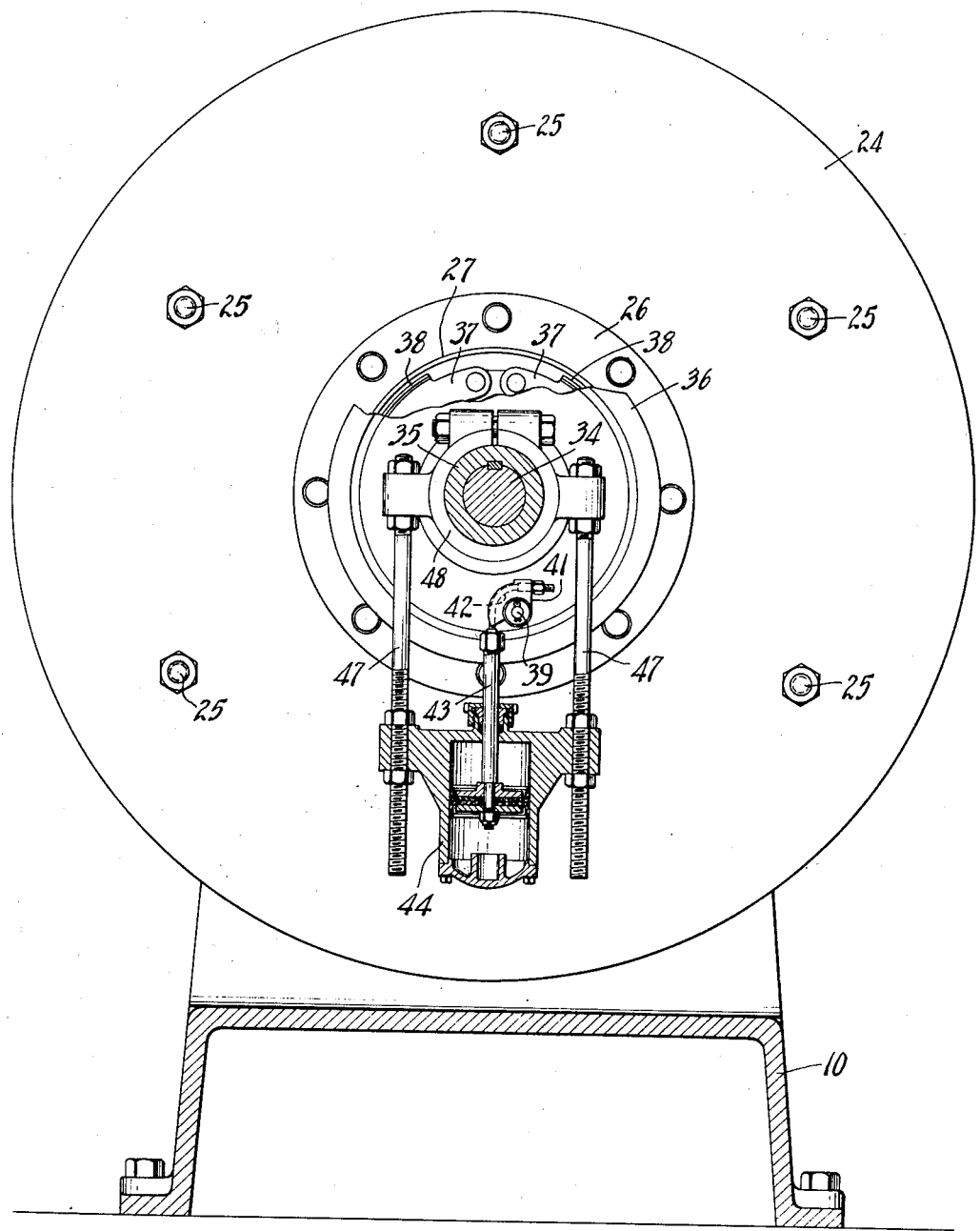
Figure 5 is a section on the line 5—5 of Figure 1, on a larger scale.

Referring to the drawings, the apparatus shown in Figures 1 to 5 thereof comprises an elongate base member 10 upon one end portion of which is mounted a motor 11 that drives, through a coupling 12, a transmission device 13 similar to those used in motor vehicles, said transmission being provided with the usual gear shift lever 14, and being supported by a bracket 15 mounted upon base 10. A guard 16 is mounted over a portion of the coupling 12. The transmission 13 is connected by a coupling 17 to the drive shaft of a reduction gear device 18 of which 19 is the driven shaft thereof, said device 18 being analogous to the rear axle assembly of a motor vehicle without the differential gearing.

At one end the shaft 19 is formed with a flange 21 to which is secured the hub 22 of a flywheel, the latter including a normally fixed inertia plate 23 that is secured to said hub, and a plurality of inertia plates 24, 24 of lighter weight mounted upon the hub and removably secured to the fixed plate 23 by bolts 25, 25. Mounted upon the front of hub 22 is a mounting plate 26, and mounted upon the latter, concentric with shaft 19, is a brake drum 27. The arrangement is such that inertia plates 24 are easily added to or removed from the flywheel so that the inertia and torque conditions in motor vehicles of different weights are easily simulated.

The end portion of the base 10 remote from the motor 11 is formed on its top face with a dovetail slideway 29 upon which is mounted a slide 30, the latter being movable toward and away from the flywheel by means of the usual screw 31 provided with an operating handwheel 32. The slide 30 comprises a bracket 33, the upper portion of which is formed as a bearing for a torque shaft 34 that is in axial alignment with the shaft 19 of the reduction gear device 18. The end of torque shaft 34 that is nearest the flywheel has keyed thereon the hub 35 of a braking structure that comprises a supporting disc 36, brake shoes 37, 37, (Figure 5) and respective brake linings 38 on the brake shoes 37. The brake structure is of the internal expanding type, the brake shoes 37 being expanded mechanically by the usual cam (not shown) that is mounted upon a cam-shaft 39, Figure 5, that projects through the supporting disc 36. In the operative position of the apparatus, the braking structure described is disposed within the brake drum 27.

Mounted upon the projecting end portion of the cam-shaft 39 is a peripherally grooved quadrant 41, in the groove of which is mounted a short flexible cable 42 that has one of its ends secured to the quadrant and has its other end secured to the outer end of the piston rod 43 of a single-acting fluid pressure operated cylinder 44. A fluid inlet and outlet pipe 45 communicates with the chamber of the cylinder 44 through the upper head thereof, and a bleeder pipe 46 communicates with said chamber through the lower head of the cylinder. The cylinder 44 is supported by a pair of tie-rods 47, 47 that extend downwardly from a yoke 48 that is fixedly mounted upon the hub 35 of the braking structure. The arrangement is such that pressure fluid admitted to the fluid pressure cylinder 44 moves the piston rod 43 downwardly and thereby operates the braking mechanism to spread the brake shoes 37 so that the linings 38 thereof bear against the rotating brake drum 27, with the result that rotation of the latter is frictionally resisted and the drum and its driving elements are brought to rest.

The brake shoes are expanded against the tension of the usual springs (not shown), which springs restore the several parts, including the cylinder piston, to inoperative position when the pressure fluid in said cylinder is released. During the braking operation power to the motor 11 automatically is disconnected by means presently to be described.

During the braking operation, the torque of the brake drum and its driving means is transmitted through the braking mechanism to the torque shaft 34 on which said mechanism is mounted, said torque being measured by a dynamometer associated with said torque shaft. The dynamometer comprises a torque flange 50 that is secured by bolts 51 to a similarly shaped flange 33a concentrically formed on the bearing portion of bracket 33. Keyed to the outer end of torque shaft 34 is a torque plate 52 that is formed with four, symmetrically disposed, rectangular apertures 53,53. King posts 54,54 are mounted on the torque flange 50, and project laterally therefrom through the respective apertures 53 and into respective cylinders 55 mounted on the outer face of the torque plate 52 over said apertures. The cylinders 55 are formed with longitudinally disposed slots 56, Figure 3, to receive the respective king posts, and the end portions of the latter, interiorly of the said cylinders, are provided with respective anti-friction rollers 57.

Each cylinder 55 has heads 59 at its respective ends, each of said heads being formed with a pressure chamber 60 into which projects an axially disposed piston 61. The latter is carried by a guide structure 62 that has a sliding fit within the cylinder 55, both guide structures 55 in said cylinder normally abutting the roller 57 of king post 54. The chambers 60 are filled with fluid such as oil, and respective conductor pipes 63 extend from each chamber 60 to a common manifold 64 mounted upon the torque plate 52 at the axis thereof. A fluid conductor pipe 65 extends from the manifold 64 to an instrument panel, presently to be described. The arrangement is such that relative movement of the torque plate 52 and torque flange 50 in either direction will cause four of the pistons 61 to move into their chambers 60 and force the fluid therefrom, whereby the pressure of the fluid in the manifold 64 and pipe 65 is increased, said increased pressure being a function of the torque of shaft 34.

As is shown in Figure 1, an instrument table 67 is positioned beside the apparatus described, and mounted in said table is a recording device 68 for making a graphic record of the operation of the apparatus. Thus the fluid-conducting pipe 65 is connected to a pressure-operated indicator 69 associated with the recording device for recording torque. A clock 70 mounted in the table 67 is electrically connected to a time indicator 71 associated with the recording device for recording time intervals of one-tenth ($\frac{1}{10}$) minute each thereon. A pressure-operated recorder 72 is connected by pipe 73 with fluid-pressure pipe 45 for recording the air pressure in the brake-operating mechanism. An electrically-operated indicator 74 is connected by conductor wires 75 with an electrically operated revolution counter 76 on the reduction gear device 18, whereby the speed of the flywheel and the brake drum 27 is recorded by the recording device 68.

Mounted on the back of the table 67 is an instrument panel 78. Mounted on the latter is an air pressure gauge 79 connected by pipe 80 to pipe 45 for visibly indicating the pressure of the brake-operated mechanism. An electrically operated indicator 81 is mounted on panel 78 and connected by conductor wires 82 to a tachometer 83 associated with reduction gear device 18 for visibly indicating the speed of the motor 11. Also mounted upon the instrument panel is a cut-off switch 85 that has driving connection, through flexible shaft 86, with a rotating shaft in the transmission device 13, said switch being electrically connected to a multiple-contact relay switch 126, Figure 11, for operating the latter when the speed of motor 11 attains a determinate maximum. As shown in Figure 11, switch 126 has connection, through conductor wires 127, with motor 11, and is adapted to open said connection to cut off electrical power to the motor when operated by switch 85 as described. The switch 126 also has electrical connection through conductor wire 128 with a solenoid-operated three-way valve 87 in the pipe 45 whereby said valve is opened to admit fluid pressure to the cylinder 44 to operate the brake mechanism concurrently with the cutting of power to the motor.

A zero speed switch 89 is mounted on the base 10 and is belt-driven from any suitable motor-driven part, such as the coupling 12 as shown, said switch being closed when the motor is running and automatically opened as soon as the motor stops. The switch 89 is in parallel with cut-off switch 85 through a shunt or holding circuit 129 that includes one pair of contacts of the relay switch 126, whereby the coil in relay switch 126 is maintained in energized condition after the conductors 127 to motor 11 have been opened, and switch 85 opens due to the slowing down of the motor. As soon as motor 11 stops, switch 89 opens, thus de-energizing the coil of relay switch 126 and causing the latter to resume its normal condition shown, with the result that conductor 128 is opened and valve 87 permitted to close. This shuts off fluid pressure to the brake-operating mechanism and exhausts cylinder 44 so that said mechanism returns to inoperative position. The arrangement results in the releasing of the brake as soon as the motor 11 stops rotating so that back-lash of the dynamometer is not transmitted to the driving mechanism of the apparatus. A clock 90 on panel 78 may be provided for effecting automatic starting of the motor 11 at determinate time intervals, so that after the brake drum 27 and brake lining 38 to be tested are in place in the apparatus, the testing thereof is automatically accomplished and a permanent record of results is made.

The operation of the apparatus may be briefly summarized as follows. The motor 11 is automatically started by clock 90, and upon attaining determinate speed its power is cut off by switch 85 which also acts concurrently to operate solenoid valve 87 to admit fluid pressure to cylinder 44, whereby the brake is applied to brake drum 27. With the application of the brake, the torque of the flywheel and the shaft 21 is transmitted to torque shaft 34, said torque being yieldingly resisted by the dynamometer and the magnitude of the torque being recorded by the device 68.

As soon as the braking mechanism has brought the driving mechanism to rest, the zero speed switch 89, acting through solenoid valve 87, releases the fluid pressure in cylinder 44 and thus releases the brake so that the back-lash of the dynamometer is not transmitted to the brake and driving mechanism. This completes one cycle of operation which is repeated automatically at timed intervals as the clock 90 again starts the motor.

The feature of mounting the braking mechanism on the slide 30 facilitates the inspection, mounting, and removal of the brake band and brake drum, and also facilitates the mounting and removal of the inertia discs 24 on the flywheel whereby the torque is varied. The apparatus permits the testing of brakes under various conditions such as are met with in service on motor vehicles, and achieves the other advantages set out in the foregoing statement of objects.

The embodiment of the invention shown in Figures 6 and 7 is identical with that previously described except in the dynamometer employed. Said dynamometer comprises a radial torque arm 92 that is mounted upon the end portion of torque shaft 34a and extends downwardly therefrom, the free end of said torque arm being slotted to receive a link 93 to which it is pivotally connected at 94 at the middle thereof. Upon each end of link 93 is pivotally mounted a piston or presser pad 95 that normally engages a flexible diaphragm 96 that constitutes one side of a chamber 97 formed in a bracket 98 that is mounted upon slide 30a. The chambers 97 are filled with fluid such as oil, and respective pipes 99 extend therefrom to a manifold (not shown) that communicates with a recording device such as that shown in the previously described embodiment. The arrangement is such that the torque of the torque shaft 34a moves the arm 92 to compress the fluid in one of the chambers 97, and thereby to record said torque in terms of pressure on the recording device. This type of dynamometer is simpler than that previously described, but is not balanced as is the latter.

The embodiment of the invention shown in Figures 8 to 10 inclusive comprises a base member 100 upon one end of which is mounted a motor 101, the other end portion of the base being extended upwardly so as to constitute a housing 100a for reduction gear mechanism (not shown), the latter being connected to the motor by a coupling 102. A zero speed switch 103 is shown mounted on the base 100 and belt-driven from the motor shaft. The driven shaft of said reduction gear mechanism projects from the front of the housing 100a and carries a flywheel 104, also a wheel 105 that is arranged to rotate with said shaft, the said wheel carrying a tire 106 and a brake drum 107.

Journaled upon the outer end of said driven shaft is a braking mechanism comprising hub structure 109, and pivotally mounted at 110, 110 thereon are brake shoes 111 provided with respective brake linings 112 to be tested, said brake shoes being disposed adjacent the inner periphery of the brake drum 107. The hub 109 also carries a fluid pressure-operated wheel cylinder 113 that is connected to the free ends of brake shoes 111 and an inlet and outlet pipe 114 supplies pressure fluid to said cylinder from a source of supply (not shown). The arrangement is such that charging of cylinder 113 spreads the free ends of brake shoes 111 so that their brake linings 112 frictionally engage the inner surface of brake drum 107. A tension spring 115 has its respective ends connected to the brake shoes 111 for withdrawing them from the brake drum when the fluid pressure is released in the cylinder 113.

When the brakes are applied to the rotating brake drum 107 the torque of the latter is transmitted to the brake hub 109, and for measuring said torque said hub is provided with a radial, substantially horizontal torque-arm 117 that has its free end connected by a link 118 to a reducing arm 119 that is fulcrumed at its adjacent end upon a fulcrum link 120. The latter is pivotally suspended from a spindle 121 that is carried by a laterally projecting bracket arm 122 formed on an upwardly-extending, forwardly overhanging scale-support 123 that is mounted upon the housing portion 100a of the base member 100. Suspended from the scale-support 123 is a scale or spring balance 124 to the lower end of which is operatively connected the free end of reducing arm 119. The arrangement is such that the torque applied to hub 109 is transmitted through the leverage described to the scale 124, which has a suitably calibrated dial for visibly indicating the magnitude of said torque. The apparatus may be provided with the other instrumentalities (not shown) necessary for automatic operation, similar to the arrangement shown in the first described embodiment of the invention.

The feature of mounting a wheel and tire on the brake testing apparatus especially adapts it for demonstration purposes since the brake is shown in conjunction with devices with which brakes usually are associated. The wheel and tire also supplement the flywheel in producing torque comparable to that to which the brake is subjected in service.

Modification may be resorted to without departing from the spirit of the invention or the scope of the appended claims, which are not limited wholly to the specific construction shown and described.

What is claimed is:

1. Apparatus for testing brakes, said apparatus comprising a brake drum, means for rotating the same, braking mechanism associated with the brake drum, yielding means restraining the braking mechanism against rotation, means controlled by the rotative speed of the drum-rotating means for applying the braking mechanism to the brake drum and for retracting it therefrom whereby torque transmitted from the brake drum through the braking mechanism deforms said yielding means, and means for measuring the deformation of said yielding means as a function of the magnitude of said torque.

2. In apparatus for testing brakes, the combination of a brake drum, means for rotating the same, braking mechanism associated with said brake drum, means controlled by the speed of the drum rotating means for applying the braking mechanism to the drum, and means for measuring the torque transmitted by the brake drum to the braking mechanism.

3. In apparatus for testing brakes, the combination of a brake drum, means for rotating the same, braking mechanism associated with said brake drum, means for applying the braking mechanism to the drum to stop the rotation thereof, means for measuring the torque transmitted by the brake drum to the braking mechanism, and means operated by the stopping of rotation of the brake drum for automatically releasing the braking mechanism immediately the drum is brought to rest.

4. In apparatus for testing brakes, the combination of a brake drum, means for rotating the same, braking mechanism associated with said brake drum, means controlled by the drum rotating means for applying the braking mechanism to the drum when the latter attains determinate speed, means for measuring the torque transmitted from the brake drum to the braking mechanism, and means for releasing the braking mechanism immediately the drum ceases rotating.

5. In apparatus for testing brakes, the combination of a brake drum, means for driving the same including an electric motor, braking mechanism associated with the brake drum, means controlled by the speed of the drum-driving means for concurrently shutting off power to the motor and applying the braking mechanism to the brake drum when the rotation of the brake drum attains determinate speed, and means for measuring the magnitude of the torque transmitted from the brake drum to the braking mechanism.

6. In apparatus for testing brakes, the combination of a brake drum, means for driving the same including an electric motor, braking mechanism associated with the brake drum, means for concurrently shutting off power to the motor and applying the braking mechanism to the brake drum when the rotation of the brake drum attains determinate speed, means for releasing the braking mechanism immediately the drum comes to rest, and means for measuring the magnitude of the torque transmitted from the brake drum to the braking mechanism.

7. In apparatus for testing brakes, the combination of a brake drum, means for driving the same, brake mechanism associated with the brake drum, means for applying the braking mechanism to the drum, a journaled shaft supporting the braking mechanism, a plurality of symmetrically arranged yielding means carried by the shaft, a plurality of stationary abutments cooperating with said yielding means for resisting angular movement of the same, and means associated with said yielding means for determining the torque transmitted from the brake drum to the braking mechanism during a braking operation.

8. In apparatus for testing brakes, the combination of a brake drum, means for driving the same, brake mechanism associated with the brake drum, means for applying the braking mechanism to the drum, a journaled shaft supporting the braking mechanism, means for moving said shaft axially to change the position of the braking mechanism with relation to the brake drum, yielding means resisting angular movement of said shaft in either direction, and means associated with said yielding means for determining the torque transmitted from the brake drum to the braking mechanism during a braking operation.

RAYMOND W. ALLEN.